United States Patent [19]

Hobart

[11] Patent Number: 4,459,975

[45] Date of Patent: Jul. 17, 1984

[54] SOLAR ENERGY CONVERTER

[76] Inventor: William M. Hobart, 425 Church St., Whitinsville, Mass. 01588

[21] Appl. No.: 317,831

[22] Filed: Nov. 3, 1981

Related U.S. Application Data

[63] Continuation of Ser. No. 197,677, Oct. 16, 1981, abandoned.

[51] Int. Cl.³ ............................................... F24J 3/02
[52] U.S. Cl. .................................... 126/449; 126/417; 126/431
[58] Field of Search ............... 126/417, 449, 429, 431, 126/450; 160/166 R

[56] References Cited

U.S. PATENT DOCUMENTS

| | | | |
|---|---|---|---|
| 2,381,158 | 8/1945 | Green | 160/166 |
| 3,990,635 | 11/1976 | Restle | 237/126 |
| 4,002,159 | 1/1977 | Angilletta | 126/270 |
| 4,050,366 | 9/1977 | Wiklund | 98/110 |
| 4,054,125 | 10/1977 | Eckels | 126/270 |

*Primary Examiner*—Larry Jones
*Assistant Examiner*—Noah Kamen
*Attorney, Agent, or Firm*—Blodgett & Blodgett

[57] ABSTRACT

Converter for use in a location adjacent the inside of a window to receive solar energy and change it to useful heat.

4 Claims, 10 Drawing Figures

U.S. Patent Jul. 17, 1984 Sheet 1 of 2 4,459,975
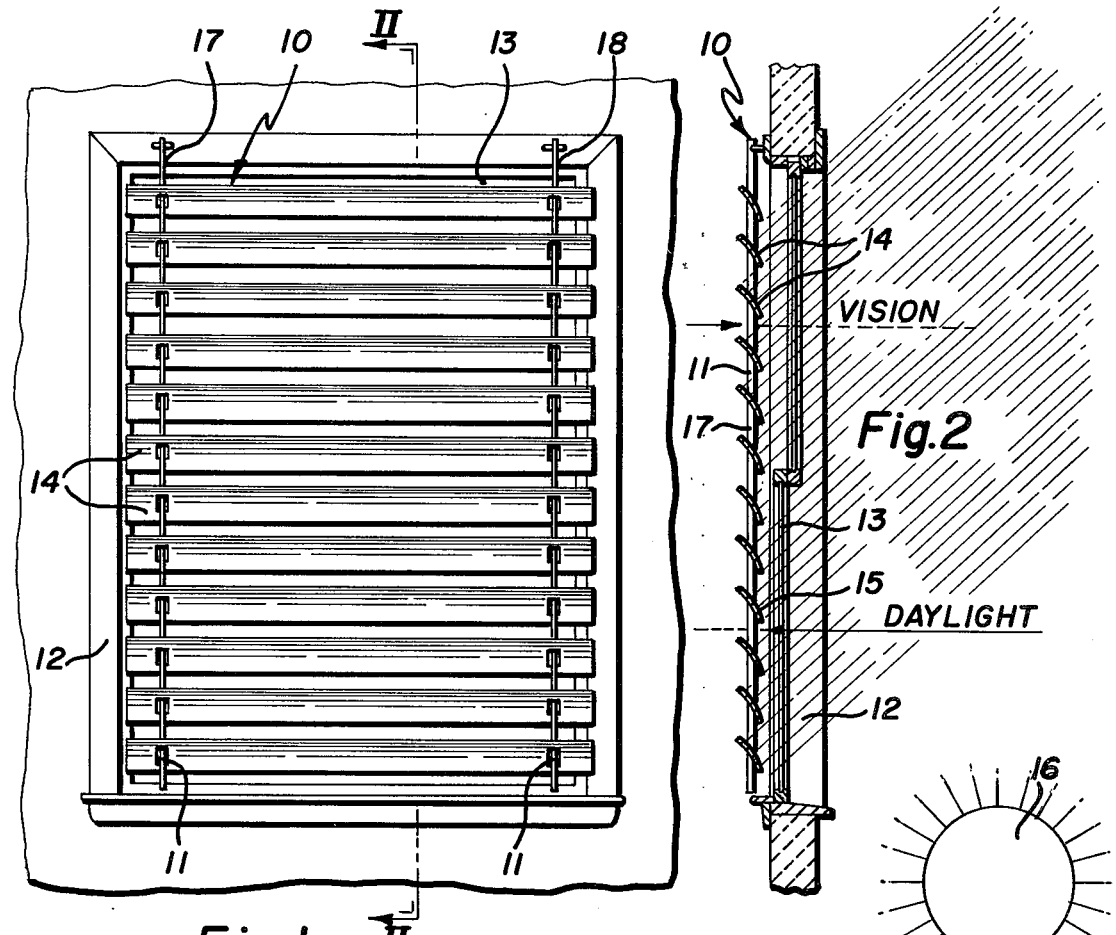
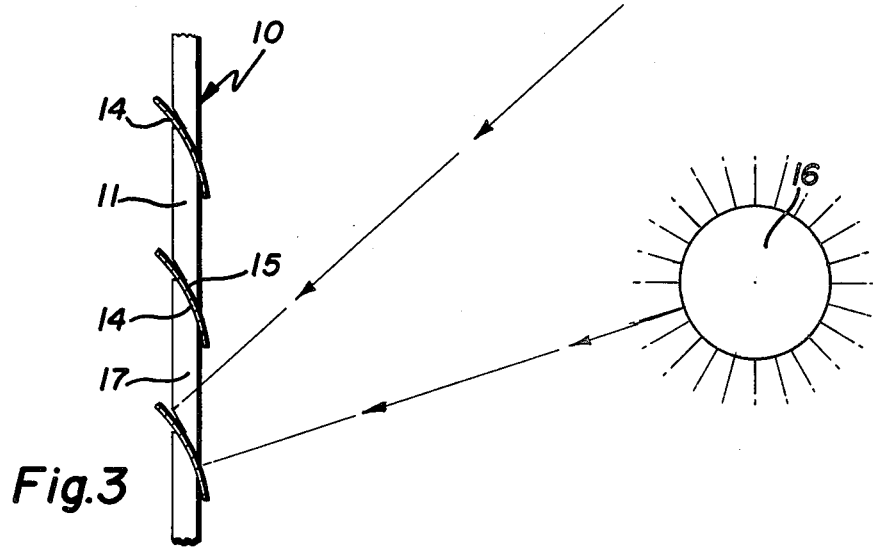

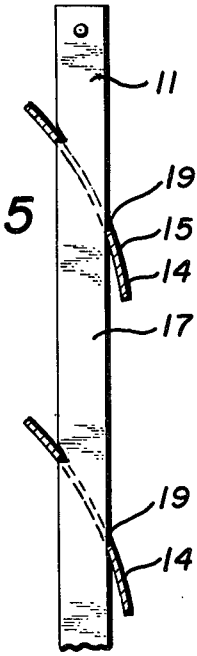
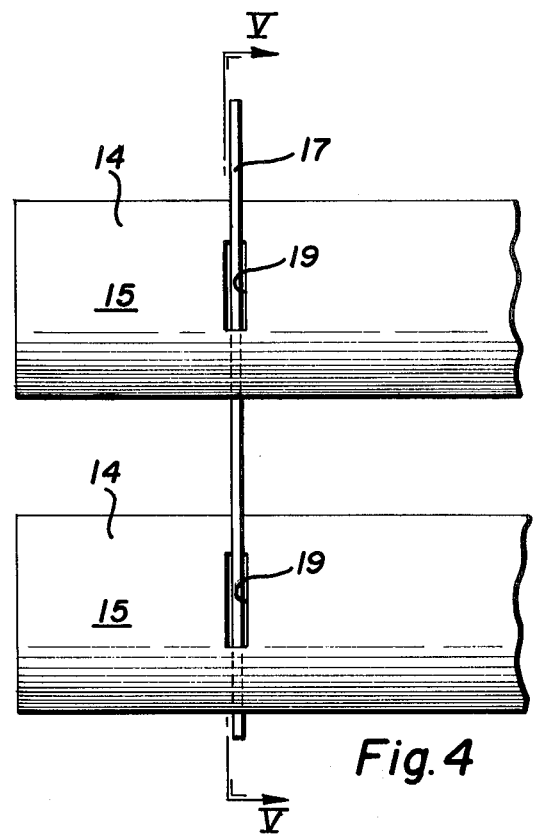
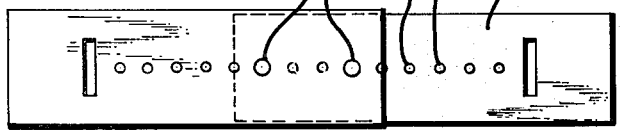
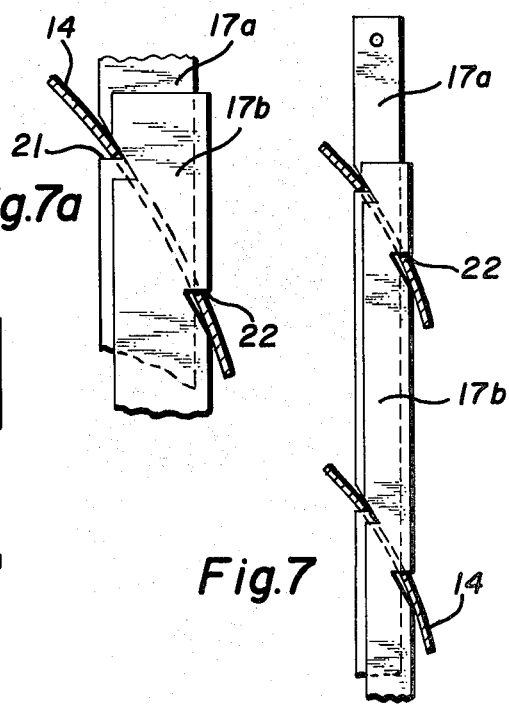
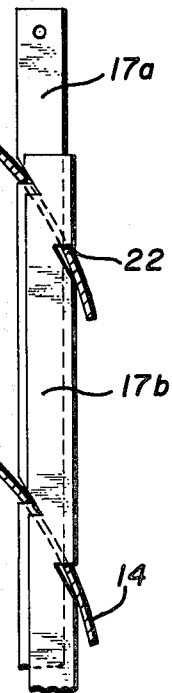

SOLAR ENERGY CONVERTER

This is a continuation, of application Ser. No. 197,677 filed Oct. 16, 1981 now abandoned

BACKGROUND OF THE INVENTION

The rays of the sun which fall on an exposed surface on a sunny day contain considerable amounts of energy. It has been calculated, for instance, that a square foot of cross-section of the sun's rays contains 86,000 BTU's in a day. When these rays fall on a window, they pass through in the form of actinic rays, as well as ultraviolet and infrared, the more substantial portion of the thermal energy being in the lower wave length or infrared rays. However, when sun's rays pass through a window, they do so at a fairly high angle and they usually fall on a horizontal surface beside the window such as part of the floor. Energy is absorbed by such a surface and is only re-radiated to a small extent, so that it does not add very much to the heating of the room. The heat that is thus carried by the sun's rays but is not used, has been recognized for a considerable number of years and many attempts have been made to utilize it. Most of the inventions in this area involve a screen (similar to a venetain blind) where slats are mounted transversely of the window to receive the heat and convert it to useful energy. It has even been suggested that the slats be coated with a heat-absorptive material. Prior attempts have been less than successful for a number of reasons: the slats seem to be incapable of trapping any high percentage of the sun's energy. There is no provision for the admission of light into the room or to allow any degree of observation outwardly and attempts to produce a flow of air have not been effective. Most of this prior art apparatus has been very expensive and requires substantial adjustment and attention to operate to its highest degree. These and other difficulties experienced with the prior art devices have been obviated in a novel manner by the present invention.

It is, therefore, an outstanding object of the invention to provide apparatus for receiving the sun's rays and converting them efficiently into useful heat.

Another object of this invention is the provision of solar energy converter arranged beside a window to change the sun's rays to heat and, nevertheless, to allow light to enter the room and to permit a person inside of the room to see out to a certain extent.

A further object of the present invention is the provision of a solar converter which is simple in construction, which is inexpensive to manufacture, and which is capable of a long life of useful service with a minimum of maintenance.

It is another object of the instant invention to provide a solar converter which operates most effectively during the winter months, but which, nevertheless, is capable of receiving the sun's rays from a substantial range of angle and converting it effectively into heat.

A still further object of the invention is the provision of a solar converter which not only absorbs most of heat from the rays of the sun passing through a window, but converts it into a flow of heated air.

It is a further object of the invention to provide a solar energy converter consisting of curved slats whose curvature not only increases the absorption of solar energy over a wide range of angles, but also promotes effectively a proper flow of heated air.

With these and other objects in view, as will be apparent to those skilled in the art, the invention resides in the combination of parts set forth in the specification and covered by the claims appended thereto.

SUMMARY OF THE INVENTION

In general, the invention consists of a solar energy converter including a support adapted to be mounted on the inside frame of a window. A plurality of slats are mounted on the support, each slat being curved in the transverse direction with a convex surface facing the window. Each slat is formed of a material having a high capacity for thermal absorption and having the said convex surface coated with a heat-absorbing coating.

More specifically, the support consists of two spaced, parallel beams, each having a rectangular cross-section with the longitudinal direction extending perpendicular to the window. Each slat has an elongated slot through which each beam passes and each beam having a notch in which the edge of the slot rests. The dimensions of the beam and of the slots in the slats are selected in such a way that the convex surface of the slat is directed in such a way that more heat is absorbed when the sun is in the winter range of angles.

BRIEF DESCRIPTION OF THE DRAWINGS

The character of the invention, however, may be best understood by reference to one of its structural forms, as illustrated by the accompanying drawings, in which:

FIG. 1 is a front elevational view of a solar energy converter built in accordance with the principles of the present invention shown in use with a window, FIG. 2 is a vertical sectional view of the converter taken on the line II—II of FIG. 1, FIG. 3 is an enlarged sectional view of the converter showing its relationship to the sun's rays, FIG. 4 is an enlarged rear elevational view of the converter taken from the window side, FIG. 5 is an enlarged vertical sectional view of the converter, FIG. 5A is an even larger view of a portion of the beam support, FIGS. 6 and 6A are plan and vertical edge views, respectively, of a modified form of a slat used in the converter, and FIGS. 7 and 7A are enlarged views showing the still further modification of the structure of a beam used in the converter.

DESCRIPTION OF THE PREFERRED EMBODIMENT

Referring first to FIGS. 1 and 2, which best show the general features of the invention, it can be seen that the solar energy converter, indicated generally by the reference numeral 10, is provided with a support 11 which is mounted on the inside frame 12 of a window 13. Mounted on the support 11 are a plurality of horizontal, parallel, vertically spaced slats 14. Each slat is formed from a thick sheet of aluminum or other metal having a high capacity for absorbing thermal energy.

The support consists of two spaced, parallel, vertical beams 17, each beam having a rectangular horizontal cross-section. As is evident in FIGS. 4 and 5, each slat 14 has a slot 19 through which each of the beams 17 and 18 pass. Referring to FIG. 5a, each beam has a step means such as a notch 21 to receive one end of the slot 19.

In FIGS. 6 and 6A it can be seen that in an alternative form of the invention the slat 14a has a length which is adjustable by means of a number of central apertures 23. Fasteners 24 extend through the apertures and hold the two halves in a selected, fixed, longitudinal position.

In FIGS. 7 and 7A it can be seen that the beam 17a is a modified form of the invention that is also made adjustable by being formed in two overlapping parts whose corresponding notches can be located in a generally coincidental position to provide adjustment of the length of the beams. The beams 17a and 17b are not only provided with notches 21, but also with notches 22 at the other edge.

The operation and advantages of the present invention will now be readily understood in view of the above discussion. The beams 17 and 18 are suspended from the upper part of the frame 12 of the window 13 by means of hooks. Slats can then be introduced on the lower end of the beam and dropped into place in the notches which hold them in the proper spaced positioning and, since the beams extend vertically downwardly, the angularity of the slats 14 is determined by its relationship to the beam. This is best evident in FIG. 2. When the sun's rays strike the surface of the slats 14, the absorbant coating, combined with the highly heat-absorbant nature of the metal from which the slats are formed, causes the slat to heat up and by convection and radiation heat up the air between the window 13 and the vanes themselves. As is evident in FIG. 3, the curvature of the slats 14 provides an outwardly-directed convex surface 15 which is curved so that the sun's rays strike the surface approximately at a right angle to a tangent both in a high and a low position. This curvature will be selective, of course, to allow this to occur mostly in the late fall, winter, and early spring months at which time of year the heat is necessary. At other times of the year the converter 10 would probably be removed from the window, but in any case (with the sun very, very high) the effect would not be as great. In any case, the flow of air, therefore, takes place up the space between the window 13 and the converter and passes inwardly in the space between the slats. With the slat adjustment means shown in FIGS. 6 and 6A it is possible to adjust the slats to accommodate itself to a wide range of window sizes. In the same way the vertical height can be adjusted by use of the means shown in FIGS. 7 and 7a.

It can be seen, then, that, because the converter slats are fixed in spaced position and at an appropriate angle in the notches provided on the supporting beams, the mounting angle and the curved or arcuate profile provide proper focus of the convex surface of each slat with the sun at relatively low positions throughout the heating season from September through March. Sunlight passing through the window is converted immediately into thermal energy within the absorbing slats. This causes heat-transfer to the surrounding air, thus inducing convection of heated air upward and inward. The air flow thus generated is directed by the vane effect of the series of concave sides of the slat and this conversion is continuous while sunlight is present and, consequently, produces free solar heat in the building. Anodized aluminum slats provide the most efficient solar energy collection, conversion and heat-transfer. The spaces are provided between the slats to permit free and unobstructed flow of converted air through the absorber slat assembly for maximum heat-transfer and most effective heated air delivery into the room. This feature also provides for vision outwardly through the device and through the window from within the building. It also allows a limited amount of sunlight to enter the building for natural illumination, while providing some shading protection against fading of colors in articles in the room.

The design of the invention is of the utmost in simplicity and has a minimum number of different parts, all parts being of a simple shape. It provides assembly dimension alternatives for a broad variety of window lengths and widths. It will be necessary to install two support hooks at the upper part of the window lintel. In addition, the invention provides optimum durability and fire safety by use of heavy gauge aluminum absorber slats, by using metal support beams and metal support hooks. There is a minimum of maintenance and the optimum of aesthetic value is achieved with permanent dark colored anodized finishes.

The National Energy Act of 1978 defined a challenge to be met that would serve to reduce American consumption of fuel and its dependency on its imported fuels. The development of on-site solar energy equipment has been encouraged by the U.S. Department of Energy with goals for solar alternatives to supply 20% of the energy demand toward a balanced energy program. While active systems with flat plate collectors have proven successful in domestic hot water and space heating applications, the present high cost of these systems (with long term pay-back) serves to retard consumer implementation and the utilization of the renewable solar energy source. With the present invention, a low cost device is provided to retrofit existing buildings with solar collection capability. The present invention reduces the cost of equipment by avoiding the necessity for some of the more expensive parts that are necessary to construct an outdoor flat plate collector. The present invention does not require an enclosure case, a transparent panel, collector supporting components, and motor-driven fans or pumps that are necessary in the more elaborate outdoor installations. The present invention is intended to be installed indoors adjacent windows that face south, east and west where sunlight is generally unobstructed in the winter season. The invention, therefore, utilizes the building as an enclosure and the existing windows as the transparent panels and it serves to convert sunlight into thermal energy delivering heated air directly within the building by means of natural convection and without any other means such as pumps or fans. The U.S. Department of Energy has established passive solar heating gain potentials as high as 120,000 BTU's per square foot of collector area. The average home or small building with approximately 8 windows can be retro-fitted easily by the consumer with 8 units of this invention to provide as much as 140 square feet of solar collector area. Adapting this low cost equipment serves to facilitate utilizing solar energy to produce a supplementary heat that may be as high as 16,800,000 BTU's per year. This is an equivalent of the usable heat of 120 gallons of oil per year.

In a commercial version of the invention, the cost of this equipment was approximately $3.00 per square foot, so that $420 (reduced by the 30% energy tax credit) results in a net cost of 294. At present oil prices this means a payback possibility of 2 years. The invention has an effective life expectancy of 10 years, so that the consumer may realize an average return as high as $114 (30%) per year on this investment, assuming that oil prices do not change. The invention, therefore, offers substantial longterm savings for the consumer and provides an alternative means of utilizing renewable solar energy, while providing an opportunity to reduce fossil fuel consumption and the demand for imported oil. While a single on-site installation appears to contribute little to the national energy goal, when this contribution is multiplied by millions of homes and small buildings that could be equipped, the consumption reduction is appreciable.

In the commercial version of the invention, the converter 10 was located 4 inches inwardly of the window glass. The slats were made of heavy gauge aluminum, which was 0.025 inches thick and which had high thermal conductive characteristics. The slat width was approximately 3 inches and was curved to an arcuate profile to provide proper focus with the sun at varying winter season angles. The arcuate slat profiles were held fixed at an appropriate angle, so that the sun's rays would impinge perpendicularly to corresponding positions on the slat curve to collect solar energy most efficiently. In performance tests the absorber slat temperatures have ranged from 55° nightroom temperature to 130° daytime temperature during the lowest insolation in December. The device which was motionless and silent served to increase the room temperature from 55° to 78° during the sunlight hours. This occurred while the outdoor temperature ranged from 8° to 24° with a 24 miles per hour wind velocity.

It should be pointed out that, if it is necessary to cancel the solar collection action at any time, the slats are easily detached and stacked on the window sill, or a conventional fabric window shade may be drawn to closed position between the collector and the window.

It can be seen, therefore, that the present invention provides an improved collector of solar energy with efficient conversion to thermal energy and with effective distribution of the heat within the room or building by means of natural convection. It also provides an improved absorber slat assembly that is spaced to allow natural light to pass through to illuminate the room interior and also to permit vision outwardly by persons inside of the room, even while the converter is functioning. It also has the advantage of low cost, simple assembly, easy retrofit, optimum durability, fire safety, and aesthetic appeal with a minimum amount of maintenance.

It is obvious that minor changes may be made in the form and construction of the invention without departing from the material spirit thereof. It is not, however, desired to confine the invention to the exact form herein shown and described, but it is desired to include all such as properly come within the scope claimed.

The invention having been thus described, what is claimed as new and desired to secure by Letters Patent is:

1. Solar energy converter, comprising:
   (a) a support adapted to be mounted on the inside of the frame of a window, and
   (b) a plurality of slats mounted on the support in spaced positions, each slat being curved in the transverse direction with the convex side facing the sun, each slat being formed of a material having high thermal absorption and having the said convex side covered with a heat absorbing coating, wherein the said support consists of two spaced parallel vertical beams, each beam having a rectangular horizontal cross-section, each slat having slots through which the beams pass, each beam having a notch to receive an end of said slot, wherein each slat consists of two slidably adjustable parts.

2. Solar energy converter, comprising:
   (a) a support adapted to be mounted on the inside of the frame of a window, and
   (b) a plurality of slats mounted on the support in spaced positions, each slat being curved in the transverse direction with the convex side facing the sun, each slat being formed of a material having high thermal absorption and having the said convex side covered with a heat absorbing coating, wherein the said support consists of two spaced parallel vertical beams, each beam having a rectangular horizontal cross-section, each slat having slots through which the beams pass, each beam having a notch to receive an end of each of said slot, wherein each beam consists of two slidably adjustable parts, each having corresponding notches on opposite edges located at substantially different levels.

3. Solar energy converter, comprising:
   (a) a support adapted to be mounted on the inside of the frame of a window,
   (b) a plurality of slats mounted on the support in spaced positions, each slat being curved in the transverse direction with the convex side facing the sun, each slat being formed of a material having high thermal absorption and having the said convex side covered with a heat absorbing coating, wherein the said support consists of two spaced parallel vertical beams, each beam having a rectangular horizontal cross-section, each slat having slots through which the beams pass, each beam having a notch to receive an end of said slot.

4. Solar energy converter, comprising:
   (a) a support adapted to be mounted on the inside of the frame of a window, and
   (b) a plurality of slats mounted on the support in spaced positions, each slat being curved in the transverse direction with the convex side facing the sun, each slat being formed of a material having high thermal absorption and having the said convex side covered with a heatabsorbing coating, wherein the said support consists of two spaced parallel vertical beams, each beam having a rectangular horizontal cross-section, each slat having slots through which the beams pass and each beam having a stop means engaging the slat adjacent an end of said slot.

* * * * *